United States Patent
Al-Rushaid et al.

(10) Patent No.: US 10,897,414 B1
(45) Date of Patent: Jan. 19, 2021

(54) METHOD FOR PROVIDING HIGH-AVAILABILITY SERVICES ON ONE-WAY DATA DIODE

(71) Applicant: Saudi Arabian Oil Company, Dhahran (SA)

(72) Inventors: Abdulatif A. Al-Rushaid, Dhahran (SA); Eid S. Al-Harbi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/511,250

(22) Filed: Jul. 15, 2019

(51) Int. Cl.
*H04L 29/06* (2006.01)
*H04L 12/26* (2006.01)

(52) U.S. Cl.
CPC ...... *H04L 43/0835* (2013.01); *H04L 43/04* (2013.01); *H04L 43/106* (2013.01)

(58) Field of Classification Search
None
See application file for complete search history.

(56) References Cited

U.S. PATENT DOCUMENTS

| | | | | |
|---|---|---|---|---|
| 7,840,742 B2 * | 11/2010 | Berland | ........... | G06F 13/4027 710/315 |
| 7,992,209 B1 * | 8/2011 | Menoher | ........... | H04L 63/0227 726/26 |
| 8,068,415 B2 * | 11/2011 | Mraz | ........... | H04L 12/5601 370/230 |
| 8,068,504 B2 * | 11/2011 | Brindle | ........... | H04L 63/08 370/401 |
| 8,250,235 B2 * | 8/2012 | Harvey | ........... | H04L 63/105 709/237 |
| 8,352,450 B1 * | 1/2013 | Mraz | ........... | G06F 16/273 707/705 |
| 8,380,913 B2 * | 2/2013 | Goldring | ........... | G06F 13/4286 710/315 |
| 8,776,254 B1 * | 7/2014 | Mraz | ........... | H04L 63/123 726/26 |
| 9,189,637 B2 * | 11/2015 | Mevec | ........... | G06F 21/606 |
| 9,237,126 B2 * | 1/2016 | McEvoy | ........... | H04L 63/0227 |
| 9,967,234 B1 * | 5/2018 | Crane | ........... | H04L 9/3236 |
| 10,355,960 B2 * | 7/2019 | Lawrence | ........... | H04L 63/0428 |
| 10,558,823 B2 * | 2/2020 | Schroeder | ........... | H04L 63/1441 |
| 2017/0118123 A1 * | 4/2017 | Ishii | ........... | H04L 47/127 |
| 2020/0244487 A1 * | 7/2020 | Morimoto | ........... | H04L 12/4633 |

OTHER PUBLICATIONS

International Search Report and Written Opinion in Corresponding PCT Application No. PCT/US2020/042138 dated Oct. 23, 2020.

* cited by examiner

*Primary Examiner* — Sithu Ko
(74) *Attorney, Agent, or Firm* — Leason Ellis LLP

(57) ABSTRACT

A method of providing high-availability services across a one-way data diode is provided, wherein first network and second networks are connected by first and second data channels each including a one-way data diode. Identical signals are carried by both data channels, but only the signal carried by the first data channel reaches the second network under normal operating conditions. System heartbeats, or periodic shared signals, are used to monitor health status of the parallel data channels, and a loss of heartbeat on the high side of the data diode on the first data channel triggers a timing channel to begin measuring the failure interval relative to a preset failover value. If the failover interval is exceeded, a failover to the second data channel is executed, provided the second data channel is still receiving data from the first network.

20 Claims, 3 Drawing Sheets

Fail-over Scenarios (in High-Side)

1. Unit A is Master:
   - If(A != Heartbeat && ($A_t$ > $A_{tfailover}$ && B = $B_{Low}$))
   - Then Failover to Unit B 2. Unit B is Master:
   - If(B != Heartbeat && ($B_t$ > $B_{tfailover}$ && A = $A_{Low}$))
   - Then Failover to Unit A t = timer
A = High side of Data Diode A
B = High side of Data Diode B

FIG. 3

METHOD FOR PROVIDING HIGH-AVAILABILITY SERVICES ON ONE-WAY DATA DIODE

FIELD OF THE DISCLOSURE

This patent application generally relates to communications between two networks connected by data-diode devices, and, more particularly, to a failover arrangement to better ensure high availability of data from one network to the other.

BACKGROUND OF THE DISCLOSURE

Information technology systems are now employed to support a seemingly limitless spectrum of activities and enterprises, spanning a gamut that includes educational institutions, business operations, recreation and entertainment, and governmental and national security functions. Clearly, these varied applications do not all have the same requirements for system availability. For example, if an online seller of movie tickets experiences a service interruption or outage, it may cause inconvenience and frustration for a group of people, but it is just a movie ticket after all and one can always purchase tickets at the box office. On the other hand, the safe and profitable operation of activities such as petroleum extraction and refining require the continuous monitoring of system conditions, such as fluid pressures and flow rates. The criticality of this information demands that the sensors and the networks they communicate through must be designed for high availability, meaning that they must have an extremely low amount of downtime and need to provide real-time information regarding their operating state or health status to partner systems. On the other hand, the provision of health status and acknowledgment information to upstream clients may be prevented by the presence of one-way data diodes which many industrial systems include for the purpose of hardening a network against unwanted traffic. This reality often leads to difficulties in which critical, high-availability services have to be deployed on the less-optimal side of a one-way interface in order to maintain real-time awareness of the health status of these high-availability systems.

What is needed in the art is the solution provided by the present disclosure, which overcomes the inability to send health status in reverse over a data diode by providing critical, high-availability services in such a highly-reliable manner that there is no need to provide real-time health status information to system components on the upstream side of a one-way data diode. The present disclosure addresses this and other problems in the art.

SUMMARY OF THE DISCLOSURE

In one aspect of the disclosure, a method provides high-availability services across a one-way data diode, wherein a first network having a first node and a first security rating is located at one end of two parallel data channels that each incorporate a one-way data diode, and a second network having a second node and a second security rating is located at the other end of the two parallel data channels. Each one-way data diode comprises a low side and a high side and is configured to enable message traffic to proceed from the first node of the first network to the second node of the second network, and not in the reverse direction. Both parallel data channels carry identical message traffic originating from the first network, but in the absence of a failover condition, only message traffic from the high side of the data diode of the first data channel continues to the second node of the second network.

In another aspect of the disclosure, a heartbeat consists of periodic signals that are sent between at least the first and second high sides at regular intervals to monitor system health status. If the heartbeat is lost, a timing channel connecting the high sides of the first and second data diodes measures the time over which the loss of the second system heartbeat persists, and then compares it to a preset failover determination time $T_{failover}$. Before a failover maneuver to the second data channel is attempted, a status check module determines whether the second data channel is still receiving packets of data from the first network. The status check module repeats the status check after a preset interval of time $T_{retry}$ if the second channel is not receiving traffic. Ultimately, if the heartbeat has been undetectable for an interval of time exceeding $T_{failover}$ and the second data channel is determined to still be receiving data packets, the system executes a failover maneuver from the first data channel to the second channel, after which only message traffic from the high side of the data diode of the second data channel continues to the second node of the second network.

In yet another aspect of the disclosure, the time interval $T_{failover}$ used in the failover logic is determined, in part, by relative security ratings associated with the respective first and second networks.

In still further aspects, the present disclosure provides a method for high-availability services across a one-way data diode. The method includes the steps of providing a first data channel comprising a first one-way data diode connecting a first node of a first network having a first security rating to a second node of a second network having a second security rating, and providing a second data channel comprising a second one-way data diode connecting the first node of the first network to the second node of the second network. Each of the first and second one-way data diodes has a respective low side and a high side. The method permits only one of the first and second one-way data diodes to enable message traffic to proceed from the first node to the second node at a given time by transiting from the low side to the high side of either of the one-way data diodes while precluding message traffic in the reverse direction. A system heartbeat is sent between the first high side and the second high side at regular intervals. A timing channel measures an interval of time that a loss of the system heartbeat persists. The interval of time is compared to a preset failover determination time $T_{failover}$. The method determines, via a status check module configured by code, whether the second data channel is receiving packets of data from the first network. The determining step is repeated after a preset interval of time $T_{retry}$ in the event that the second channel is not receiving traffic. The method causes a fail over to the second data channel and does not permit continued transit of message traffic through the first data channel in the event that all of the following conditions are met: the heartbeat becomes undetectable; the interval of time measured by the timing channel reaches $T_{failover}$, and the second data channel is still receiving data packets.

BRIEF DESCRIPTION OF THE DRAWINGS

The accompanying drawing figures illustrate exemplary embodiments and are not intended to be limiting of the invention. Among the drawing figures, like references are intended to refer to like or corresponding parts.

FIG. 3 illustrates a set of exemplary failover rules.

DETAILED DESCRIPTION OF CERTAIN EMBODIMENTS ACCORDING TO THE DISCLOSURE

Figure 1:
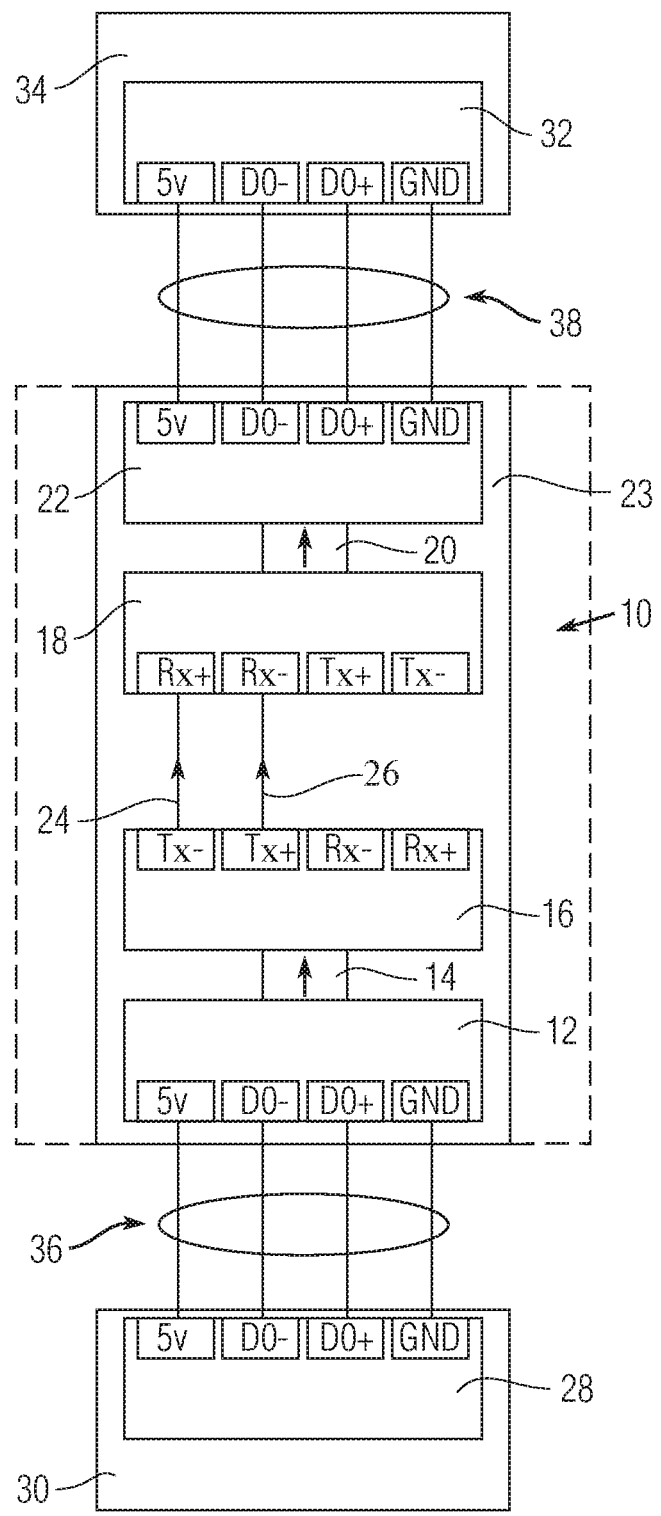
FIG. 1 illustrates a schematic view of a conventional data diode that is suitable for use in connection with the present disclosure used in the invention.

The invention encompassed by the present disclosure is now described with reference to the accompanying drawings, which form a part hereof, and which show, by way of illustration, example implementations and/or embodiments of the present invention. It is to be understood that other embodiments can be implemented, and structural changes can be made, without departing from the spirit of the present invention. Among other things, for example, the disclosed subject matter can be embodied as methods, devices, components, or systems.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The methods and systems described herein concern networks having different levels of security which are connected by respective first and second one-way data diode-enabled communication channels. The additional data-diode communication channel is a salient part of the network arrangement according to the present disclosure, and it is provided to ensure continuous operation of high-availability services that are deployed on a second network situated downstream of a first network, and downstream of the data diodes themselves.

The practice of implementing one-way data transmission using a data diode protects a high-security, restricted network from potentially dangerous message traffic transmitted by unknown or suspect networked entities, and, more particularly, protects the high-security, restricted network from network traffic which has payloads or instructions that go beyond a mere "acknowledgement" from a different network. In the present disclosure, the high security, restricted network is the source which does not accept data from other networks, such as the second network which is the destination for the data from the source.

The present disclosure provides a secure network interface comprising a first data diode-enabled secure one-way data channel and a second data diode-enabled secure one-way data channel, wherein the first and second channels are arranged in parallel connecting a first and a second network as part of a larger secure information technology system. Each of the first and second networks has a security rating, and the operation of the first and second channels can be specified in response to network conditions, including the respective security ratings of the first and second networks. Identical message traffic originating from the first network is conducted along both the first and second data diode-enabled data channels to the high side of the respective first and second data diodes. Under normal operation, only the identical signal from the high side of the first data diode continues to the destination, which is the second network. If conditions indicative of a communications failure on the first data channel are detected, the system executes a failover operation whereby the second data channel begins transmitting the message traffic received at the high side of the second data diode to the destination, the second network. The employment of two secure one-way channels, in conjunction with a robust failover capability that ensures continuous system availability, provides high reliability while obviating any need to transmit acknowledgement messages or system health status upstream.

An exemplary data diode is disclosed in U.S. Pat. No. 8,380,913 to Goldring (hereinafter "Goldring"), which is hereby incorporated by reference. A variety of data diodes can be used to practice the invention of the present disclosure, provided that they are configured to exchange heartbeat and timing information as described further below. Reference to the solution proposed by Goldring is in no way limiting of the invention or the capability of using alternative solutions to implement the one-way transmission of message traffic along the first and second data channels.

The data diode teachings of Goldring are quoted in the following paragraphs to enable that part of the network arrangement. According to Goldring and referring to FIG. 1, "the invention comprises a data diode 10 comprising a USB input port 12, a first USB to UART (universal asynchronous receiver transmitter) conversion means 14, a first serial port 16, a second serial port 18, a second USB to UART conversion means 20, a USB output port 22, and a diode housing 23." Goldring continues, "The pins of the USB input port 12 are communicatively coupled to the input of the first USB to UART conversion means 14. The first USB to UART conversion means 14 comprises a USB to RS422 converter having integrated memory, such as the Future Technology Devices International FT232R USB UART IC with integrated EEPROM. The USB to RS422 converter 14 is operable to convert a USB input signal into an RS422 output signal. The USB to RS422 converter 14 is provided with computer software embodied within the memory, the converter 14 being operable to run the software to control the flow of data through the diode 10. The design and operation of USB to UART converters is well known and so will not be discussed in any more detail here."

The Goldring patent teaches that "the first and second serial ports 16, 18 comprise standard serial ports having TX−, TX+, RX− and RX+ pins. The output of the first USB to RS422 converter 14 is communicatively coupled to the TX− and TX+ pins of the first serial port 16. The TX− pin of the first serial port 16 is connected to the RX− pin of the second serial port 18 by means of a first electrical cable 24 and the TX+ pin of the first serial port 16 is connected to the RX+ pin of the second serial port 18 by a second electrical cable 26. The TX ports of the second serial port 18 are not connected to the RX ports of the first serial port 16, thereby preventing data flow from the second serial port 18 to the first serial port 16."

Further regarding the data connections, Goldring teaches that the "RX− and RX+ pins of the second serial port 18 are communicatively coupled to the input of the second USB to UART conversion means 20, which similarly comprises a USB to RS422 converter. The second USB to RS422 converter 14 is operable to convert an input RS422 data signal into a USB data signal." "The output of the second USB to RS422 converter 20 is communicatively coupled to the pins of the USB output port 22," and the "USB input port 12, first USB to RS422 converter 14, serial ports 16, 18, second USB to RS422 converter 20, USB output port 22, and cables 24, 26 are provided within a diode housing 23."

Goldring then explains that when the data diode is in use, "the data diode 10 is coupled between the USB port 28 of a low security level processor board/computer 30 and the USB port 32 of a higher security level processor board/computer 34, using standard USB connector cables 36, 38. Data can therefore be safely transferred from the low security level computer 30 to the higher security level computer 34 without any return signal path being available, thereby preventing the low security computer 30 from obtaining data from the higher security level computer 34."

Figure 2:
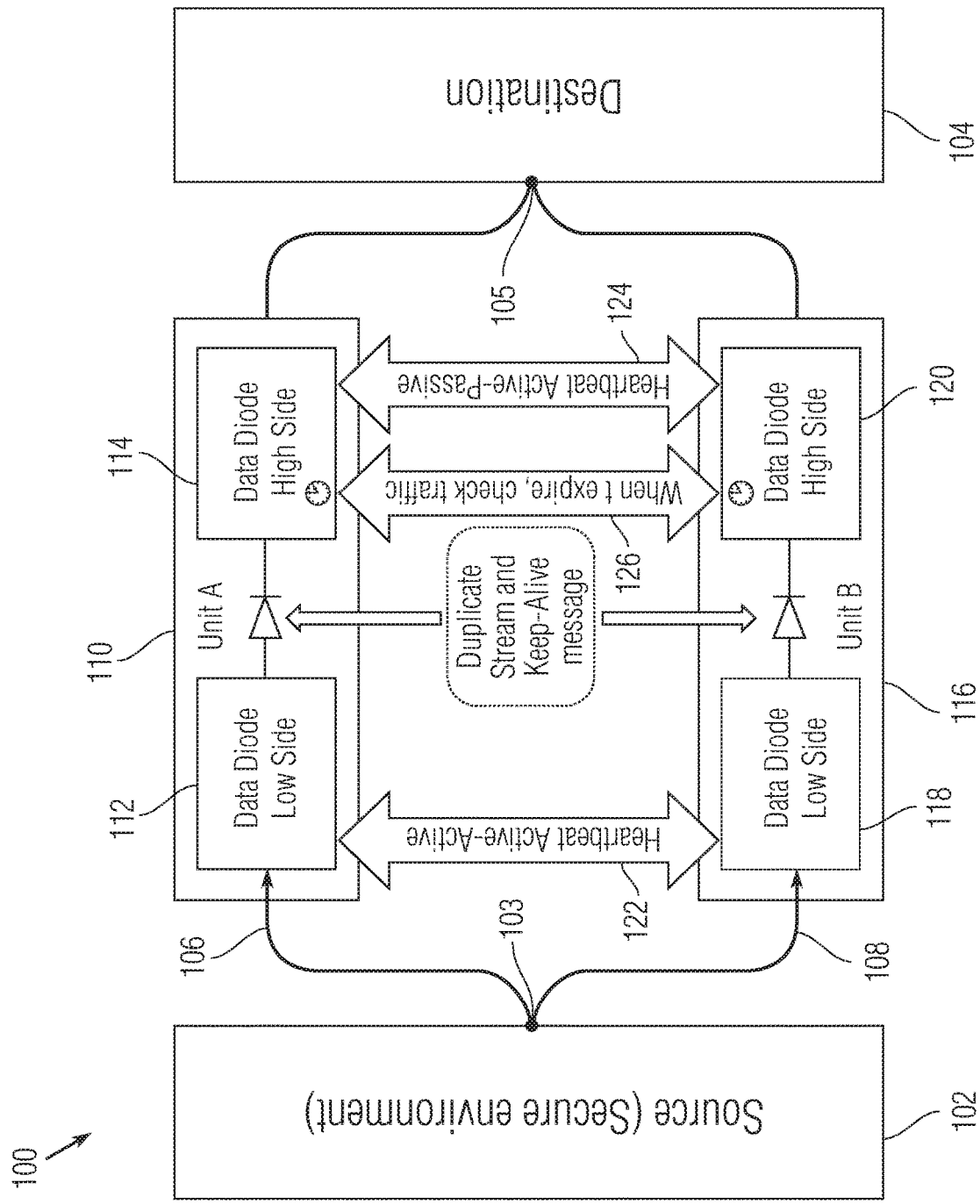
FIG. 2 illustrates a schematic view of two networks connected by first and second one-way data diode-enabled communication channels.

Referring now to FIG. 2, a network arrangement 100 is shown having a secure source environment comprising a designated first network 102 and a destination comprising a designated second network 104. In accordance with a salient aspect of the invention, a first communication channel 106 and a second communication channel 108 both extend from a first node 103 of the first network 102. The first communication channel 106 includes a first data diode 110 (also labeled "Unit A" in the figure), which can be a data diode generally as described in the aforementioned Goldring patent. The data diode has a first low side 112 and a first high side 114. The first communication channel 106 continues from the first high side 114 toward the destination, and more specifically to a second node 105 of the second network 104. Likewise, the second communication channel 108 includes a second data diode 116 (also labeled "Unit B" in the figure), which has a second low side 118, a second high side 120, and communicates from the first node 103 to the second node 105 of the second network 104. In an embodiment, either of the first data diode 110 and the second data diode 116, or both the first data diode 110 and the second data diode 116, can encode message traffic proceeding from the first node 103 to the second node 105 using Asynchronous Transfer Mode (ATM) communications.

FIG. 2 also schematically illustrates a first system heartbeat 122 between each of the respective low sides 112, 118 of the first and second data diodes 110, 116 and a second heartbeat 124 between the respective high sides 114, 120 of the first and second data diodes 110, 116, to maintain continuous, real-time indication that both data channels of the system are still functioning. The heartbeat can be any conventional signal which is indicative of device operation and which switches between high and low at a regular interval. By way of illustration, the signal can switch from high to low, from low to high, or comprise a square pulse such as a pulse having a specified duty cycle. In one implementation, for example, the heartbeat can be tapped from or based upon a system or microprocessor clock of the data diodes 110, 115, respectively. The period of the heartbeat can be down cycled to a desired rate, such as once per second.

If the situation arises in which the second heartbeat signal 124 is not detected from one of the channels 106, 108 between the respective high sides 114, 120 of the first and second data diodes 110, 116, then this can be a precipitating criterion for the possible execution of a failover, as discussed further below.

Implementations in accordance with the present disclosure also comprise a timing channel 126 which connects the respective high sides 114, 120 of the first and second data diodes 110, 116. The timing channel is configured by code executing in at least one of the hardware processors of the data diode 110, 116 at any given time. The timing channel is configured by the code to measure the interval of time that a loss of signal condition persists. A loss of signal for a specified interval of time, exceeding that which may be expected during normal operation of the system, is another precipitating criterion which can lead to the possible execution of a failover maneuver from the first data channel to the second data channel.

FIG. 3 is a pseudocode description of the logic which is implemented by code in the processors of the data diodes 110, 116 by which a failover from one data channel to the other is accomplished. The foregoing discussion can be understood to have the first data channel 106 in the role of "master," wherein the data traffic from the first network 102 is delivered from the first data diode high side 114 to the destination second network 104. In the event conditions indicating a failover of the first data channel 106 become evident, the second high side 120 of the second data diode 116 functions as a "backup" channel and commences transmission of the identical signals it is receiving from the first network 102 to the destination second network 104. It is to be understood that the respective roles of the first data channel 106 and the second data channel 108 as "master" and "backup" can be easily inverted, merely by trading the roles (and the associated failover logic) of the respective data diode high sides 114, 120.

As the first data channel 106 is functioning to transmit data traffic from first network 102 to second network 104, if the periodic second heartbeat signal 124 becomes undetectable, the timing channel 126 includes a module which comprises code which configures the processor to begin a countdown to a preset interval of time $T_{failover}$. The interval $T_{failover}$ is configurable based upon the expected utilization of the system under various conditions. A failover will not be attempted until this interval has passed, but even then, a check must be made as to whether the backup channel, namely, the second data channel 108, is still receiving packets of data from the first network 102, to avoid flapping between the two devices. If the second channel 108 is still receiving packets, the failover will be executed and the second high side 120 will take over in transmitting packets received from the first network 102 to the second network 104. On the other hand, if the second channel 108 is no longer receiving data packets, the system will wait for an interval of time, $T_{retry}$, before checking again to see if the second data channel 108 is receiving data packets. $T_{retry}$, like $T_{failover}$, is configured to suit the expected operating conditions of a specific system. In this manner, continuous operation of high-availability services is maintained.

The foregoing system, when put into operation, provides a method for supporting high-availability services across a one-way data diode. The method includes providing a first data channel and a second data channel of the type described above. Thus, the first data channel comprises a first one-way data diode connecting a first node of a first network having a first security rating to a second node of a second network having a second security rating. The second data channel comprises a second one-way data diode connecting the first node of the first network to the second node of the second network. Each of the first and second one-way data diodes has a respective low side and a high side, again, as described above.

The method permits only one of the first and second one-way data diodes to enable message traffic to proceed from the first node to the second node at a given time by transiting from the low side to the high side of either of the one-way data diodes while precluding message traffic in the reverse direction. As noted above, this implements the roles of "master" and "slave," as discussed above.

The devices previously described enable a system heartbeat to be sent between the first high side and the second high side at regular intervals. Likewise, the devices enable a timing channel to measure an interval of time that a loss of the system heartbeat persists. The interval of time can be compared to a preset failover determination time $T_{failover}$. The method determines, via a status check module configured by code, whether the second data channel is receiving packets of data from the first network. The determining step is repeated after a preset interval of time $T_{retry}$ in the event that the second channel is not receiving traffic.

The method causes a fail over to the second data channel and does not permit continued transit of message traffic through the first data channel in the event that all of the following conditions are met: the heartbeat becomes undetectable; the interval of time measured by the timing channel reaches $T_{failover}$, and the second data channel is still receiving data packets.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the invention.

While various implementations of the present application have been described above, it should be understood that they have been presented by way of example, and not limitation. It would be apparent to one skilled in the relevant art(s) that various changes in form and detail could be made therein without departing from the spirit and scope of the application. Thus, the present application should not be limited by any of the above-described example implementations.

What is claimed:

1. A system for providing high-availability services across a one-way data diode, the method comprising providing:
    a first network having a first node and a first security rating;
    a second network having a second node and a second security rating;
    a first data channel comprising a first one-way data diode connecting the first node to the second node, wherein the first one-way data diode comprises a first low side and a first high side and is configured to enable message traffic to proceed from the first node to the second node, and not in the reverse direction;
    a second data channel comprising a second one-way data diode connecting the first node to the second node, wherein the second one-way data diode comprises a second low side and a second high side and is configured to enable message traffic to proceed from the first node to the second node, and not in the reverse direction;
    a system heartbeat shared by the first high side and the second high side, comprising a periodic signal that is sent between the first high side and the second high side at regular intervals;
    a timing channel, connecting the respective high sides of the first and second data diodes, configured by code to measure an interval of time that a loss of the system heartbeat persists and compare the interval to a preset failover determination time $T_{failover}$;
    a status check module configured by code to determine whether the second data channel is receiving packets of data from the first network, and further configured to repeat the determination after a preset interval of time $T_{retry}$ if the second channel is not receiving traffic; and
    a failover to the second data channel if all of the following conditions are met:
        the heartbeat becomes undetectable;
        the interval of time measured by the timing channel reaches $T_{failover}$; and
        the second data channel is still receiving data packets.

2. The system according to claim 1, wherein the time interval $T_{failover}$ is determined, in part, by relative security ratings associated with the respective first and second networks.

3. The system as in claim 1, wherein the first security rating is higher than the second security rating.

4. The system as in claim 3, wherein a source environment resides on the first network and a destination resides on the second network.

5. The system as in claim 4, wherein the first network connects the source environment to the destination at least partially using unshielded twisted pair cables.

6. The system as in claim 1, wherein the first one-way data diode encodes message traffic proceeding from the first node to the second node using asynchronous transfer mode communications.

7. The system as in claim 1, wherein the second one-way data diode encodes message traffic proceeding from the first node to the second node using asynchronous transfer mode communications.

8. The system as in claim 1, wherein both the first one-way data diode and the second one-way data diode encode message traffic proceeding from the first node to the second node using asynchronous transfer mode communications.

9. The system as in claim 1, further comprising a first system heartbeat shared by the first low side and the second low side of the first one-way data diode and the second one-way data diode, respectively, comprising a periodic signal that is sent between the first low side and the second low side at regular intervals.

10. The system as in claim 9, wherein the first system heartbeat, the system heartbeat or both the first system heartbeat and the system heartbeat are tapped from or based upon a system or microprocessor clock of the respective first and second one-way data diodes.

11. A method for providing high-availability services across a one-way data diode, the method comprising:
  providing a first data channel comprising a first one-way data diode connecting a first node of a first network having a first security rating to a second node of a second network having a second security rating;
  providing a second data channel comprising a second one-way data diode connecting the first node of the first network to the second node of the second network,
  wherein each of the first and second one-way data diodes has a respective low side and a high side;
  permitting only one of the first and second one-way data diodes to enable message traffic to proceed from the first node to the second node at a given time by transiting from the low side to the high side of either of the one-way data diodes while precluding message traffic in the reverse direction;
  sending a system heartbeat between the first high side and the second high side at regular intervals;
  measuring via a timing channel an interval of time that a loss of the system heartbeat persists;
  comparing the interval of time to a preset failover determination time $T_{failover}$;
  determining, via a status check module configured by code, whether the second data channel is receiving packets of data from the first network,
  repeating the determining step after a preset interval of time $T_{retry}$ in the event that the second channel is not receiving traffic; and
  failing over to the second data channel and not permitting continued transit of message traffic through the first data channel in the event that all of the following conditions are met:
    the heartbeat becomes undetectable;
    the interval of time measured by the timing channel reaches $T_{failover}$, and
    the second data channel is still receiving data packets.

12. The method as in claim 11, wherein the system heartbeat comprises a periodic signal.

13. The method as in claim 11, wherein the time interval $T_{failover}$ is determined, in part, by relative security ratings associated with the respective first and second networks.

14. The method as in claim 11, wherein the first security rating is higher than the second security rating.

15. The method as in claim 14, wherein a source environment resides on the first network and a destination resides on the second network.

16. The method as in claim 15, wherein the first network connects the source environment to the destination at least partially using unshielded twisted pair cables.

17. The method as in claim 11, wherein the first one-way data diode encodes message traffic proceeding from the first node to the second node using asynchronous transfer mode communications.

18. The method as in claim 11, wherein the second one-way data diode encodes message traffic proceeding from the first node to the second node using asynchronous transfer mode communications.

19. The method as in claim 11, wherein both the first one-way data diode and the second one-way data diode encode message traffic proceeding from the first node to the second node using asynchronous transfer mode communications.

20. The method as in claim 11, further comprising the step of sharing a first system heartbeat between the first low side and the second low side of the respective first and second one-way data diodes, respectively, the first system heartbeat comprising a periodic signal identifying that the respective first and second one-way diodes are receiving data from a source environment.

\* \* \* \* \*